3,336,417
PROCESS FOR PREPARING GRAFT COPOLYMERS OF STYRENE-ACRYLONITRILE-METHYL METHACRYLATE ONTO BUTADIENE-STYRENE COPOLYMER
Toramitsu Sakuma and Iwao Nakamura, Urawa-shi, Saitama-ken, Japan, assignors, by mesne assignments, to Hamano Resin Co., Ltd., Tokyo, Japan, a corporation of Japan
No Drawing. Filed Mar. 12, 1964, Ser. No. 351,539
Claims priority, application Japan, Dec. 10, 1963, 38/66,075
4 Claims. (Cl. 260—880)

This invention relates to the process for manufacture of quaternary graft copolymer of thermoplastic methyl methacrylate, styrene, acrylonitrile and butadiene, of which polymerization reaction rate can be easily controlled in high temperature range and of which reaction can be completed in a short time satisfactorily with the use of less amount of methyl methacrylate monomer than required in customary process, and moreover which has excellent processabilities, and physical properties and good transparency. More particularly, it relates to the process for the manufacture of transparent thermoplastic quaternary graft copolymer of methyl methacrylate, styrene, acrylonitrile and butadiene which comprises graft-copolymerizing methyl methacrylate-styrene-acrylonitrile copolymer with butadiene-styrene copolymer by emulsion polymerization of monomeric methyl methacrylate, styrene and acrylonitrile with a butadiene-styrene copolymer latex in the presence of, at least, catalysts, a polymerization controlling agent and an emulsifier, characterized in that an admixture comprising 14 to 24 parts by weight of methyl methacrylate monomer, 77 to 62 parts by weight in total of styrene- and acrylonitrile monomers and 9 to 14 parts by weight of butadiene-styrene copolymer expressed as solid content in the latex is emulsion copolymerized with the use of mixed catalysts comprising water soluble redox catalyst and water insoluble free radical producing catalyst in molar ratio of 3:1–10:1. It is already known up to the present that a transparent graft copolymer is manufactured by emulsion polymerization of an admixture comprising latices of various gummy diene polymers and methyl methacrylate or a compound copolymerizable with it.

Such materials are known as hard, tough and thermoplastic molding materials which have high impact strength and good weathering resistance. However, these materials available for commercial applications have well known defects which restrict their industrial applications. The first of these defects is that the process of polymerization thereof is too complicated and requires too long reaction time, and moreover the raw materials to be used are restricted remarkably.

The second large defect of such polymer materials being used at present is that final moldings obtained from the polymeric materials are semitransparent or opaque.

The first object of the present invention is to provide a process for the manufacture of a new transparent quaternary graft copolymer by graft copolymerization of a copolymer of methyl methacrylate, styrene and acrylonitrile with the well known ordinary latex of butadiene-styrene copolymer.

Another object of the present invention is, when the copolymer comprising the above-mentioned monomers is emulsion polymerized with the above-mentioned latex of copolymer to yield the graft copolymer in the presence of catalysts, a polymerization controlling agent and an emulsifying agent, to provide a process for the manufacture of a transparent graft copolymer which is industrially advantageous because of the remarkable shortening of polymerization reaction time with the use of an admixture of a composition within the specific range and a mixed-catalysts system comprising water soluble redox catalyst and a water insoluble free radical producing catalyst such as, for example, benzoyl peroxide or lauroyl peroxide, at specific molar ratios.

The other objects and advantages of the present invention will be much more clarified in following detailed description.

It is found that the graft copolymer obtained by emulsion polymerization of a copolymer of monomers comprising single vinyl radical with the latex of butadiene-styrene copolymer has, in the case of the present invention, remarkably excellent transparency, high impact strength, good weathering resistance, high surface hardness and toughness, and moreover excellent flow property when applied in molding process.

The latex of butadiene-styrene copolymer is a well known, industrially available material obtained by emulsion polymerization process. Methyl methacrylate, styrene and acrylonitrile monomers are also well known materials.

In the process of hte present invention, less amounts of methyl methacrylate and butadiene-styrene copolymer than required in customary processes are used.

The composition of raw materials is as follows:

| | Parts by weight |
|---|---|
| Methyl methacrylate monomer | 14–24 |
| Styrene and arcylonitrile monomer, in all | 77–62 |
| Butadiene-styrene copolymer latex (as solid) | 9–14 |

Butadiene-styrene copolymer latex and acrylonitrile are useful for increasing impact strength of polymeric material finally obtained, and styrene is useful to give a good flow character to the product during its shaping operation. Methyl methacrylate is useful for increasing light transmittance or transparency and keeping high heat deformation temperature.

In customary process, when monomers such as methyl acrylate, ethyl acrylate, methyl methacrylate, ethyl methacrylate, propyl methacrylate, butyl methacrylate, acrylonitrile and methacrylonitrile etc. are used, because of their remarkably large effect on heat deformation temperature of finally obtained polymer, the amount of the single one or the mixture of these monomers is restricted remarkably and, therefore, a considerably large amount of, for example, methyl mehacrylate has been required.

In general, the more is the amount of methyl methacrylate, the higher is the water absorption of the product polymer and, accordingly, disadvantages from the viewpoint of quality and economy are unavoidable.

In the process of the present invention, a transparent thermoplastic quaternary graft copolymer is provided which has excellent heat and chemical resistance, excellent gloss of surface, high impact strength, good weathering resistance, increased hardness and toughness and excellent flow characteristic at the time of molding, by producing a polymeric material with high graft ratio by an effective graft polymerization reaction at temperatures of, in general 30° C. to 110° C., preferably 65° C. to 110° C., without increasing the amount of methyl methacrylate used. Especially, it is desirable to start reaction at temperatures approximately 65° C. to 70° C. and to keep temperatures 80° C. to 110° C., preferably about 90° C. to 105° C., from the beginning to the middle stage of the reaction.

In the process of the present invention, the raw material admixture of the specific composition mentioned previously is emulsion polymerized particularly with the use of mixed catalysts in which the molar ratio of a water soluble redox catalyst and a water insoluble free radical producing catalyst is 3:1 to 10:1.

As such water soluble redox catalysts, a combination of generally used water soluble oxidizing agent and reducing agent can be used. As for several examples of oxidizing agent, ammonium persulfate, potassium persulfate, hydrogen peroxide, cumene hydroperoxide combined with sorbose or fructose, etc. are illustrated. Also, as for reducing agents, water soluble compounds such as ferrous salts, chrome salts, sulfite salts, hydroxylamine, hydrazine, sodium thiosulfate, etc. are illustrated. In this case, well known decomposition accelerator, auxiliary reducing agent, etc. which are normally added to such redox catalysts, may be added. Giving a concrete example, a combination of

| | Percent by weight |
|---|---|
| Cumene hydroperoxide | 0.75 |
| Sodium pyrophosphate (decomposition accelerator) | 0.5 |
| Ferrous sulfate | 0.02 |
| Dextrose (auxiliary reducing agent) | 1.0 | is preferably applicable.

As for water insoluble free radical producing catalyst applicable in the process of the present invention, for example, water insoluble organic peroxides such as benzoyl peroxide, lauryl peroxide, methyl ethyl ketone peroxide, etc., or tertiary organic azo-compound such as $\alpha,\alpha'$-azo-diisobutylonitrile, are illustrated. Amounts of the admixed catalysts used in the process of the present invention are varied depending upon the sort of the catalysts and the process of polymerization employed, and also upon to some degree the extent of stirring to mix the emulsion during the reaction. They may be applicable in general by amounts of approximately 0.3–3.0% by weight based on the material mixture. The sorts and the amounts of catalysts most preferred to obtain the combination of the most suitable properties intended for the product polymer will be more precisely explained by the examples later illustrated.

When the amount of methyl methacrylate monomer used in the process of the present invention is increased over the range of the present invention, the control of the rate of polymerization becomes remarkably difficult, the polymerization within so elevated temperature range as in the process of the present invention becomes extremely difficult, and the regulation of the polymerization state is quite impossible. Accordingly, the reaction must always be performed at lower temperatures than 80° C. and extremely long time is required before the polymerization is completed. Moreover, as for a polymer obtained by such a process, it is unavoidable that it has not so excellent transparency as the one by the process of the present invention and that its resistance to heat and water is also decreased.

In the present process, as precisely illustrated later, it is possible to provide a quaternary graft copolymer of methyl methacrylate, styrene, acrylonitrile and butadiene having excellent resistance to heat, high transparency, high impact strength, good resistance to weather and chemicals, moreover excellent flow characteristics at the time of molding, without increasing the amount of methyl methacrylate monomer, by a graft polymerization reaction suitably performed of which polymerization rate is easily controlled with the use of specific combination of water soluble redox catalyst and water insoluble free radical producing catalyst as the polymerization initiator.

The object is attained with less amount of methyl methacrylate monomer than required in customary processes. The reaction is, therefore, easily performed, and moreover the copolymer obtained is very easy processing and is markedly advantageous industrially. This is one of the marked characteristics of the process of the present invention.

Another large characteristic of the process of the present invention is, as previously illustrated, when a small amount (14 to 24% by weight) of a copolymer of methyl methacrylate, styrene and acrylonitrile is graft copolymerized with a latex of butadiene-styrene copolymer in the presence of catalysts, polymerization controlling agent and emulsifying agent, that the polymerization rate is easily controlled at a high temperature range with the use of skillful combination of water soluble redox catalyst and water insoluble free radical producing catalyst as the mixed catalyst system (polymerization initiator), that the reaction is also completed in a short time, and that it is possible to advantageously provide a polymeric material with a graft ratio suited for the purpose.

Emulsifying agents generally used in emulsion polymerization are also applicable to the present procedure. The examples include sulfonated or sulfated long chain hydrocarbons, alkali metal salts of animal or vegetable oils and fats, water soluble salts and soaps of sulfates of aliphatic alcohols corresponding to fatty acids of animal or vegetable oils and fats. Special examples include lauryl sodium sulfate, oleil sodium sulfate, or cetyl sodium sulfate, sodium salt of sulfonated castor oil, sodium salt of sulfonated or sulfated methyl oleate, sodium oleate, sodium palmitate, sodium stearate, and hydrogenized or dehydrogenized rosin acid soap and their mixtures.

More special examples include a mixture of an alkali salt of unmodified and unhydrogenized rosin acid and an alkali salt of hydrogenized and modified rosin acid.

Polymerization controlling agents applicable to the present procedure are as follows: aliphatic mercaptans, organic polysulfides, e.g., di-(secondary butyl) disulfide, di-(2-methyl-butyl) disulfide and di-alkyl xanthogene disulfide, nitro-di-aryl polysulfide, e.g. di-ortho-di-nitrophenyl disulfide, and primary, secondary and tertiary alkyl mercaptans, e.g. dodecyl mercaptan. It is said that, among aliphatic mercaptans, in general, the use of primary, secondary or tertiary aliphatic mercaptain which contains not less than 6 but not more than 18 carbon atoms per one molecule is desirable, since these compounds provide good results. A mixture of these controlling agents is also applicable. Moreover, as special examples, one of, at least, tetraethylthiuram disulfide, benzene, carbon tetrachloride and chloroform and similar polymerization controlling agent may be also applicable.

The amount of controlling agent used is within a range of approximately 0.2 to 3.0% by weight to monomers used. It is just as well known that light stabilizer such as methyl salicylate or phenyl salicylate, anti-oxidizing agent such as hydroquinone or amine type oxidation resisting agent for rubber, fillers, coloring matters, etc. may be added after completing the polymerization.

In the next place, the originality of the present invention will be illustrated more precisely by Examples and Controls, measuring methods of properties used in them being explained hereinbelow.

Rockwell hardness is determined by ASTM test method D-785-51A, R-scale.

Extruding rate is shown in ($x$ $10^{-3}$) cc. of volume of polymer extruded per one second from the polymer-containing vessel through the standard orifice set in the lower part thereof under the standard temperature and pressure, namely (200° C., 30 kg./cm.²).

Notch Izod impact strength is determined according to A.S.T.M. D-256 method; however, it is shown in unit of kg.–cm./cm.² after correction for cross section.

Heat deformation temperature is determined always by A.S.T.M. test method D-648-54T (264 p.s.i., ° C.)

Whole light transmittance is measured by J.I.S. K-6717. A piece of test plate of about 50 mm. x 50 mm. size and 3.4±0.2 mm. thickness is prepared, and it is measured by integral sphere form light transmittance measuring equipment using standard light source (J.I.S. Z 8701) combined with Davis and Gibson's filter. The standard white plate is set in the equipment, the slit is controlled, and the reading of the galvanometer ($T_1$) is adjusted to 100. It is operated thereafter according to the procedures mentioned below, and the indicated scale of the galvanometer is read, then the light transmittance is calculated by the following Equation (a):

PROCEDURE FOR MEASUREMENT

| | Test piece | Trap | Standard white plate | Reading of galvanometer | Quantity obtained |
|---|---|---|---|---|---|
| 1 | Provided | Not provided | Provided | $T_1$ | Quantity of light of incidence (100). |
| 2 | Not provided | do | do | $T_2$ | Whole light transmittance. |

$T = T_2/T_1 \times 100$ (a).

where T: light transmittance (percent)

In addition, measurements are performed at the temperature of 23±1° C. and the relative humidity of 50±4%.

Swelling index is calculated by Equation (1) undermentioned. 0.3 g. of butadiene-styrene copolymer is immersed in 75 ml. of benzene and kept at room temperature in perfect darkness for 24 hours. The mixture obtained is filtered through a weighed 100 mesh sieve of stainless steel and the insoluble polymer is washed with 100 ml. of benzene. It is assumed that the weight of insoluble polymer swelled by solvent after washing is $(A)g$ and, after evaporating and drying the filtrate, the weight of dissolved butadiene-styrene copolymer is $(B)g$. Then the swelling index is calculated by following Equation (1)

$$\frac{(A)g}{0.3g - (B)g} \quad \text{Equation (1)}$$

In the next place, several circumstances in which the procedures of the present invention are performed are explained by examples of practice. In addition, several examples concerning the case when the only one ingredient in the mixed catalyst in the procedure of the present invention is used and when the ratio of raw material composition is out of the range in the process of the present invention, and so on, are illustrated for comparison.

EXAMPLE 1

To 100 parts by weight of raw material mixture having the ratio mentioned below, namely,

| | Parts by weight |
|---|---|
| Latex of butadiene-styrene copolymer (which has the amounts of 23 parts by weight of bonded styrene in total solid content, swelling index of 29 and average particle diameter of approximately 0.3µ) | ¹ 13.0 |
| Acrylonitrile monomer | 22.0 |
| Styrene monomer | 45.0 |
| Methyl methacrylate monomer | 20.0 |

¹ As solid content.

water soluble redox catalysts (A) with the composition mentioned below and water insoluble free radical producing catalyst (B), emulsifying agent and polymerization controlling agent, namely,

| Catalyst A: | Parts by weight |
|---|---|
| Cumene hydroperoxide | 0.75 |
| Sodium pyrophosphate | 0.5 |
| Ferrous sulfate | 0.02 |
| Dextrose | 1.0 |
| Catalyst B: | |
| Benzoyl peroxide | 0.2 |
| Emulsifying agent A: | |
| Sodium rosinate hydrogenized and modified | 3.0 |
| Emulsifying agent B: | |
| Na-salt of alkyl naphthalene sulfonic acid condensate | 0.15 |
| Polymerization controlling agent: | |
| Tertiary dodecyl mercaptan | 1.0 |
| Water (including that in butadienestyrene copolymer) | 240.0 | were added. Then they were stirred in a glass reaction vessel to yield as a whole a uniform emulsion, and after the gas in the vessel was replaced by nitrogen gas, the reaction was carried out at an initial temperature of 70° C. and the ingredients were heated, stirred and reacted for 8 hours. The maximum temperature reached 105° C. during the reaction. After complete reaction, diluted hydrochloric acid was added to the produced material. Then it was condensed by heating at about 95° C., filtered, washed, heated and dried at about 85° C. till its weight became constant. Then the powder of graft copolymer was obtained.

In the dry powder obtained by such a process, the copolymer of the mixture of styrene, acrylonitrile and methyl methacrylate monomers was grafted with the raw material butadiene-styrene copolymer in a quite preferable state, and it was especially suited to extrusion molding, pelletizing and molding. This material has a good flow property. The products obtained from this material are almost colorless, and have, furthermore, high transparency, high impact strength and high heat deformation temperature.

The dry powder mentioned previously has good compatibility with high polymer resinoids such as natural rubber, synthetic rubber, polyvinylchloride resin or polycarbonate resin, etc., being valuable for industrial application covering a wide scope.

The properties of the dry powder mentioned previously are as illustrated in Table 1.

EXAMPLES 2-4

As illustrated below, the similar procedure to Example 1 was followed except that the sorts of catalysts were varied, and the dry powder of quaternary graft copolymer was obtained.

| | Catalyst A (instead of Cumene hydroperoxide) | Catalyst B (instead of Benzoyl peroxide) |
|---|---|---|
| Example 2 | Ammonium persulfate | Lauroyl peroxide. |
| Example 3 | do | Benzoyl peroxide. |
| Example 4 | Cumene hydroperoxide | Lauroyl peroxide. |

The properties of the copolymers so obtained are as illustrated in Table 1 mentioned later.

CONTROLS 1-2

For comparison, as illustrated below, the same procedures as Example 1 were followed except that the sorts of latex of polymer used were changed variously.

Latex of polymer

Control 1 _____ Polybutadiene latex (which has total solid content of about 58% and average particle diameter of about 0.3μ).

Control 2 _____ Butadiene-acrylonitrile copolymer latex (which has the amount of 20 parts by weight of bonded acrylonitrile in total solid content and average particle diameter of about 0.16μ).

other than butadiene-styrene copolymer latex as raw material, and in any case semi-transparent to opaque compositions are given.

EXAMPLES 5–20 AND CONTROLS 3–11

In these examples and controls, the similar procedures as Example 1 were followed except that the amounts of catalysts used were changed variously as shown in Table 2 below. The properties of graft copolymers thus obtained are illustrated similarly in Table 2. In addition, in order for better understanding, the judged results of the final products are shown by O (good) and X (not good).

TABLE 2

|  | Catalyst A—Amount of Cumene hydro-peroxide, percent by weight | Catalyst B—Amount of Benzoyl peroxide, cent by weight | Mixing ratio of Catalyst A and Catalyst B (mol. ratio) | Reaction yield (percent) | Whole light transmittance (percent) | Impact strength | Extruding rate | R-Hardness | Heat deformation temperature (° C.) | Judgment |
|---|---|---|---|---|---|---|---|---|---|---|
| Control 3 | 0 | 2.0 |  | 93 | (1) | 2.4 | 7.4 | 95 | 61 | X |
| Control 4 | 0 | 1.0 |  | 92 | (1) | 2.7 | 6.8 | 95 | 62 | X |
| Example 5 | 1.75 | 0.50 | 5.7 | 96 | 84 | 16 | 44 | 107 | 81 | O |
| Example 6 | 1.00 | 0.40 | 4.0 | 96 | 84 | 17 | 43 | 107 | 81 | O |
| Example 7 | 1.50 | 0.40 | 6.0 | 97 | 83 | 16 | 47 | 107 | 82 | O |
| Control 5 | 0.50 | 0.30 | 2.7 | 94 | 64 | 17 | 34 | 107 | 81 | X |
| Example 8 | 0.75 | 0.30 | 4.0 | 96 | 78 | 17 | 39 | 108 | 82 | O |
| Example 9 | 1.00 | 0.30 | 5.3 | 96 | 82 | 18 | 42 | 108 | 83 | O |
| Example 10 | 1.25 | 0.30 | 6.6 | 96 | 87 | 18 | 44 | 107 | 83 | O |
| Example 11 | 1.50 | 0.30 | 8.0 | 97 | 86 | 18 | 46 | 108 | 84 | O |
| Example 12 | 1.60 | 0.30 | 8.5 | 96 | 84 | 17 | 49 | 108 | 81 | O |
| Example 13 | 1.80 | 0.30 | 9.6 | 96 | 81 | 17 | 52 | 107 | 79 | O |
| Control 6 | 2.00 | 0.30 | 10.6 | 94 | 61 | 14 | 53 | 106 | 67 | X |
| Control 7 | 2.50 | 0.30 | 13.2 | 93 | (1) | 11 | 53 | 104 | 62 | X |
| Example 14 | 0.40 | 0.20 | 3.2 | 96 | 87 | 19 | 38 | 108 | 84 | O |
| Example 15 | 0.75 | 0.20 | 6.0 | 97 | 88 | 18 | 39 | 109 | 84 | O |
| Example 16 | 1.00 | 0.20 | 8.0 | 97 | 87 | 19 | 40 | 108 | 83 | O |
| Example 17 | 1.25 | 0.20 | 9.9 | 96 | 86 | 19 | 42 | 108 | 83 | O |
| Control 8 | 1.50 | 0.20 | 12.2 | 94 | 58 | 15 | 43 | 106 | 69 | X |
| Control 9 | 2.00 | 0.20 | 16.0 | 94 | (2) | 12 | 45 | 105 | 64 | X |
| Example 18 | 0.50 | 0.15 | 5.4 | 96 | 86 | 20 | 33 | 107 | 86 | O |
| Example 19 | 0.75 | 0.15 | 8.0 | 96 | 86 | 19 | 34 | 108 | 85 | O |
| Example 20 | 0.50 | 0.10 | 9.0 | 95 | 84 | 21 | 33 | 107 | 85 | O |
| Control 10 | 2.00 | 0 |  | 92 | (1) | 2.6 | 32 | 96 | 62 | X |
| Control 11 | 3.00 | 0 |  | 93 | (1) | 2.2 | 23 | 95 | 61 | X |

1 Opaque.  2 Semitransparent.

The products obtainable from the dry powders obtained by such procedures show white gray color and poor transparency; namely they are semi-transparent to opaque.

The properties of the dry powders obtained are as illustrated in Table 1 mentioned below.

From Table 2 above, it is known that only the polymers prepared in the presence of Catalyst A (cumene hydroperoxide) and Catalyst B (benzoyl peroxide) at a molar ratio in the range of 3:1 to 10:1, have excellent transparency (whole light transmittance higher than 75%) and high impact strength (notch Izod impact strength higher than 15) in addition.

TABLE 1

|  | Yield of reaction (percent) | Whole light transmittance (percent) | Izod impact strength | Extruding rate | R-Hardness | Heat deformation temperature (° C.) | Judgment |
|---|---|---|---|---|---|---|---|
| Example 1 | 97 | 88 | 18 | 39 | 109 | 84 | O |
| Example 2 | 95 | 85 | 17 | 42 | 107 | 84 | O |
| Example 3 | 96 | 87 | 17 | 44 | 108 | 83 | O |
| Example 4 | 96 | 86 | 16 | 41 | 107 | 84 | O |
| Control 1 | 95 | (1) | 19 | 36 | 102 | 86 | X |
| Control 2 | 96 | (1) | 11 | 27 | 106 | 82 | X |

1 Semi-transparent.

From Table 1, it is known that Examples 1, 2, 3 and 4 give compositions which have excellent transparency (whole light transmittance higher than 75%) and high impact strength (notch Izod impact strength higher than 15 kg.-cm./cm.$^2$), as intended by the present inventor. Contrary to this, it is known from Controls 1 and 2 that the compositions intended is not obtained using latices

EXAMPLES 21–29 AND CONTROLS 12–29

In these examples and controls, as shown in Table 3, the similar procedures as Example 1 were followed except that the amounts of methyl methacrylate monomer were changed variously and the ratios of other raw materials mixture were correspondingly changed variously.

The properties of polymers obtained and the judged results similar as in Table 2 are just as Table 3 below.

TABLE 3

| | Butadiene-styrene copolymer latex: solids content, percent by weight | Acrylonitrile monomer, percent by weight | Styrene monomer, percent by weight | Methyl methacrylate monomer, percent by weight | Reaction yield (percent) | Whole light transmittance (percent) | Izod impact strength | Extruding rate | R-hardness | Heat deformation temperature | Judgment |
|---|---|---|---|---|---|---|---|---|---|---|---|
| Control 12 | 16 | 19 | 45 | 20 | 95 | (¹) | 27 | 21 | 102 | 87 | X |
| Control 13 | 14 | 33 | 45 | 8 | 96 | 62 | 23 | 28 | 104 | 87 | X |
| Control 14 | 14 | 29 | 45 | 12 | 96 | 67 | 21 | 33 | 106 | 87 | X |
| Example 21 | 14 | 25 | 45 | 16 | 96 | 78 | 19 | 35 | 107 | 87 | O |
| Example 22 | 14 | 21 | 45 | 20 | 96 | 81 | 18 | 36 | 107 | 86 | O |
| Example 23 | 14 | 17 | 45 | 24 | 96 | 84 | 16 | 37 | 108 | 86 | O |
| Control 15 | 14 | 13 | 45 | 28 | 95 | 82 | 13 | 37 | 108 | 84 | X |
| Control 16 | 12 | 38 | 50 | 0 | 95 | (²) | 24 | 19 | 96 | 86 | X |
| Control 17 | 12 | 34 | 50 | 4 | 95 | (¹) | 22 | 21 | 101 | 87 | X |
| Control 18 | 12 | 30 | 50 | 8 | 95 | (¹) | 21 | 26 | 106 | 86 | X |
| Control 19 | 12 | 26 | 50 | 12 | 96 | 67 | 19 | 30 | 107 | 85 | X |
| Example 24 | 12 | 22 | 50 | 16 | 96 | 83 | 18 | 37 | 108 | 87 | O |
| Example 25 | 12 | 18 | 50 | 20 | 97 | 86 | 18 | 41 | 107 | 87 | O |
| Example 26 | 12 | 18 | 46 | 24 | 96 | 88 | 16 | 46 | 108 | 86 | O |
| Control 20 | 12 | 18 | 42 | 28 | 96 | 61 | 12 | 47 | 107 | 79 | X |
| Control 21 | 12 | 18 | 30 | 40 | 96 | (¹) | 8.1 | 42 | 107 | 74 | X |
| Control 22 | 12 | 14 | 14 | 60 | 94 | (¹) | 6.2 | 36 | 107 | 71 | X |
| Control 23 | 10 | 4 | 6 | 80 | 95 | (¹) | 5.6 | 28 | 106 | 68 | X |
| Example 27 | 9 | 25 | 50 | 16 | 96 | 87 | 17 | 43 | 107 | 82 | O |
| Example 28 | 9 | 25 | 46 | 20 | 96 | 88 | 18 | 47 | 108 | 81 | O |
| Example 29 | 9 | 25 | 42 | 24 | 96 | 88 | 17 | 49 | 108 | 81 | O |
| Control 24 | 7 | 23 | 50 | 20 | 93 | 91 | 12 | 56 | 108 | 74 | X |
| Control 25 | 12 | 0 | 68 | 20 | 94 | 88 | 13 | 45 | 107 | 72 | X |
| Control 26 | 12 | 0 | 48 | 40 | 95 | 87 | 6.5 | 42 | 108 | 68 | X |
| Control 27 | 12 | 0 | 18 | 70 | 94 | 87 | 5.2 | 37 | 107 | 66 | X |
| Control 28 | 12 | 68 | 0 | 20 | 93 | (¹) | 9.6 | 21 | 107 | 64 | X |
| Control 29 | 12 | 18 | 0 | 70 | 92 | (¹) | 4.3 | 24 | 107 | 61 | X |

¹ Semi-transparent.  ² Opaque.

From Table 3 above, it is known that, as shown in Examples 21–29, only the polymers prepared under the conditions in which butadiene-styrene copolymer latex used is 9 to 14 parts by weight as solid content, methyl methacrylate monomer is in the range of 14 to 24 parts by weight and the total amount of styrene monomer and acrylonitrile monomer is 77 to 62 parts by weight, have excellent transparency and high impact strength.

On the other hand, as shown in Controls 12–29, it is known that the objects of the present invention are not attained when the composition of raw materials is outside the range of the present invention, even if the mixed catalysts at the specified molar ratio are used.

We claim:
1. A process for the manufacture of transparent, thermoplastic quaternary graft copolymer of methyl methacrylate, styrene, acrylonitrile and butadiene which comprises graft-copolymerizing methyl methacrylate-styrene-acrylonitrile copolymer with butadiene-styrene copolymer by emulsion polymerization of monomeric methyl methacrylate, styrene and acrylonitrile with a butadiene-styrene copolymer latex in the presence of polymerization catalysts, a polymerization controlling agent and an emulsifying agent, characterized in that an admixture comprising 14 to 24 parts by weight of methyl methacrylate monomer, 77 to 62 parts by weight in total of styrene and acrylonitrile monomers and 9 to 14 parts by weight of butadiene-styrene copolymer expressed as solid content in the latex is emulsion copolymerized with the use of mixed catalysts comprising water soluble redox catalyst and water insoluble free radical producing catalyst in molar ratio of 3:1–10:1.

2. A process as claimed in claim 1, characterized in that the emulsion polymerization above-mentioned is initiated at the temperatures of 65° C. to 70° C. and the reaction temperature is kept at 80° C. to 110° C. from the beginning to the middle stage of the reaction.

3. A process as claimed in claim 2, characterized in that the reaction temperature is kept at 90° C. to 105° C. from the beginning to the middle stage of the reaction above-mentioned.

4. A process as claimed in claim 1, characterized in that the water soluble redox catalyst is at least one system selected from the group consisting of (a) catalyst composed of cumene hydroperoxide, sodium pyrophosphate, sodium thiosulfate, ferrous sulfate and dextrose, and (b) catalyst composed of ammonium persulfate, sodium pyrophosphate, sodium thiosulfate and dextrose, and water insoluble free radical producing catalyst is, at least, one of the compounds chosen from the group consisting of methyl ethyl ketone peroxide, benzoyl peroxide, lauryl peroxide and $\alpha,\alpha'$-azodiisobutylonitrile.

References Cited

UNITED STATES PATENTS 2,857,360  10/1958  Feuer _____ 260—880
3,258,506  6/1966  Siebel et al. _____ 260—880
3,287,443  11/1966  Saito et al. _____ 260—876

FOREIGN PATENTS 867,822  5/1961  Great Britain.

MURRAY TILLMAN, *Primary Examiner.*

G. F. LESMES, *Assistant Examiner.*